(12) United States Patent
Lin

(10) Patent No.: US 8,493,976 B2
(45) Date of Patent: Jul. 23, 2013

(54) MULTI-STAGE SWITCH SYSTEM

(75) Inventor: Yun Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 167 days.

(21) Appl. No.: 12/855,160

(22) Filed: Aug. 12, 2010

(65) Prior Publication Data

US 2011/0038371 A1 Feb. 17, 2011

(30) Foreign Application Priority Data

Aug. 12, 2009 (CN) .......................... 2009 1 0109298

(51) Int. Cl.
*H04L 12/56* (2006.01)
*H04J 3/14* (2006.01)

(52) U.S. Cl.
USPC .............................. 370/389; 370/235; 370/412

(58) Field of Classification Search
USPC ................. 370/218, 235, 386, 388, 389, 392, 370/412, 414, 422
See application file for complete search history.

(56) References Cited

U.S. PATENT DOCUMENTS

| 7,552,262 | B1 * | 6/2009 | Turner et al. | 710/302 |
| 8,014,288 | B1 * | 9/2011 | MacAdam | 370/235.1 |
| 8,102,763 | B2 * | 1/2012 | Du et al. | 370/230 |
| 2010/0061394 | A1 * | 3/2010 | Sindhu et al. | 370/422 |
| 2010/0165843 | A1 * | 7/2010 | Thomas | 370/235 |
| 2010/0246431 | A1 | 9/2010 | Lin et al. | |
| 2010/0272117 | A1 * | 10/2010 | Wu et al. | 370/413 |

FOREIGN PATENT DOCUMENTS

| CN | 101094238 | 12/2007 |
| CN | 101179453 | 5/2008 |
| CN | 101355430 | 1/2009 |

OTHER PUBLICATIONS

Extended European Search Report, mailed Oct. 19, 2010, in corresponding European Application No. 10172658.6 (4 pp.).

* cited by examiner

*Primary Examiner* — Hassan Phillips
*Assistant Examiner* — Saba Tsegaye
(74) *Attorney, Agent, or Firm* — Staas & Halsey LLP

(57) ABSTRACT

A multi-stage switch system includes a line card chassis (LCC) and a fabric card chassis (FCC). The LCC is configured with multiple line cards (LCs) and the FCC is configured with a stage-2 switch element (S2). The multi-stage switch system further includes a first switch combination and a second switch combination. The first switch combination and the second switch combination are configured on the LCC and the FCC respectively, and multiple LCs establish cross communication through the first switch combination, the second switch combination, and the S2. The first switch combination includes a stage-1 switch element (S1) and a first buffer area and the second switch combination includes a stage-3 switch element (S3) and a second buffer area. The multi-stage switch system can forward packets within the chassis by means of buffering the packets when guaranteeing the three-stage packet forwarding, and thus reducing the bandwidth occupancy of the FCC.

10 Claims, 7 Drawing Sheets

<Prior Art>

<Prior Art>

<Prior Art>

<Prior Art>

MULTI-STAGE SWITCH SYSTEM

CROSS REFERENCE TO RELATED APPLICATION

This application claims priority to Chinese Patent Application No. 200910109298.9, filed on Aug. 12, 2009, which is hereby incorporated by reference in its entirety.

FIELD OF THE INVENTION

The present invention relates to communication technologies, and in particular, to a multi-stage switch system.

BACKGROUND OF THE INVENTION

A switch fabric (SF) may include one or more stages of switch elements, as shown in FIG. 1, FIG. 2, FIG. 3, and FIG. 4. The SF shown in FIG. 1 and FIG. 2 includes a stage-0 switch element (S0) and multiple line cards (LCs). The SF shown in FIG. 3 and FIG. 4 includes three stages of switch elements and multiple LCs. In FIG. 1 and FIG. 3, the LC that sends uplink data flows (ingress LC) is located on one side of the switch element, and the LC that receives downlink data flows (egress LC) is located on the other side of the switch element. The LC in FIG. 2 and FIG. 4 can send uplink data flows and can also receive downlink data flows. In FIG. 4, the S1/3 includes two parts: a stage-1 switch element (S1), and a stage-3 switch element (S3). The packets sent by a source LC carry the information about a destination LC. The packets pass through the S1, stage-2 switch element (S2), and S3, and arrive at the destination LC. The packets include variable-length packets and fixed-length cells.

In a common multi-stage SF, both the LC and the S1/3 are generally located in a line card chassis (LCC). The S1/3 includes two parts: the S1, and the S3, where the S1 corresponds to the S3. In this case, the S1 and S3 may be located on the same physical component or on different physical components. The S1 may be connected to the S3 through a specific interface; the S2 is generally located in a fabric card chassis (FCC), and the FCC is connected to the LCC through optical fibers or cables, as shown in FIG. 5. According to a specific algorithm such as a load balancing algorithm, the S1 in the LCC selects an S2, and forwards the packets sent by the source LC to the FCC through optical fibers, and a repeater (RPT) in the FCC forwards the packets to the S2. The S2 switches the packets to the S3 in the LCC according to the destination LCC information carried in the packets. Finally, the S3 in the destination LCC switches the packets to the destination LC according to the destination LC information carried in the packets. The FCC may have no RPT.

The defects of the prior art are:

In practice, users may achieve system expansion by connecting multiple LCCs in a single-stage SF to an FCC. In this case, the switch elements that are configured as S0s in the LCC need to be changed to S1/3.

As described above, after system expansion is achieved, packets in all LCCs must pass through the S2 in the FCC before being switched, even if the source LC and the destination LC are located in the same LCC. That is to say, after system expansion, the LCC loses the function of local switching. Thus, sufficient interconnection bandwidth is required between the LCC and the FCC in order to meet the performance requirement and the system costs are increased. In addition, the switching performance of the system may be degraded because the traffic flowing to the S2 increases.

SUMMARY OF THE INVENTION

Embodiments of the present invention provide a multi-stage switch system to timely respond to the flow control information sent from a downstream switch unit to an upstream switch unit in a multi-stage switch fabric.

A multi-stage switch system is provided in an embodiment of the present invention. The multi-stage switch system includes a line card chassis (LCC) and a fabric card chassis (FCC). The LCC is connected to the FCC; the LCC is configured with multiple line cards (LCs) and the FCC is configured with a stage-2 switch element (S2). The multi-stage switch system further includes a first switch combination and a second switch combination. The first switch combination and the second switch combination are configured on the LCC and the FCC respectively, and multiple LCs establish cross communication through the first switch combination, the second switch combination, and the S2. The first switch combination includes a stage-1 switch element (S1) and a first buffer area and the second switch combination includes a stage-3 switch element (S3) and a second buffer area. The S1 is connected to the second buffer area and the S3 is connected to the first buffer area.

The multi-stage switch system provided in embodiments of the present invention can forward packets within the chassis by means of buffering the packets when guaranteeing the three-stage packet forwarding, and thus reducing the bandwidth occupancy of the FCC.

BRIEF DESCRIPTION OF THE DRAWINGS

In order to make the technical solution under the present invention clearer, the accompanying drawings for illustrating the embodiments of the present invention or the prior art are outlined below. Evidently, the accompanying drawings are for the exemplary purpose only, and those skilled in the art can derive other drawings from such accompanying drawings without any creative effort.

DETAILED DESCRIPTION OF THE EMBODIMENTS

Embodiment 1

Figure 1:
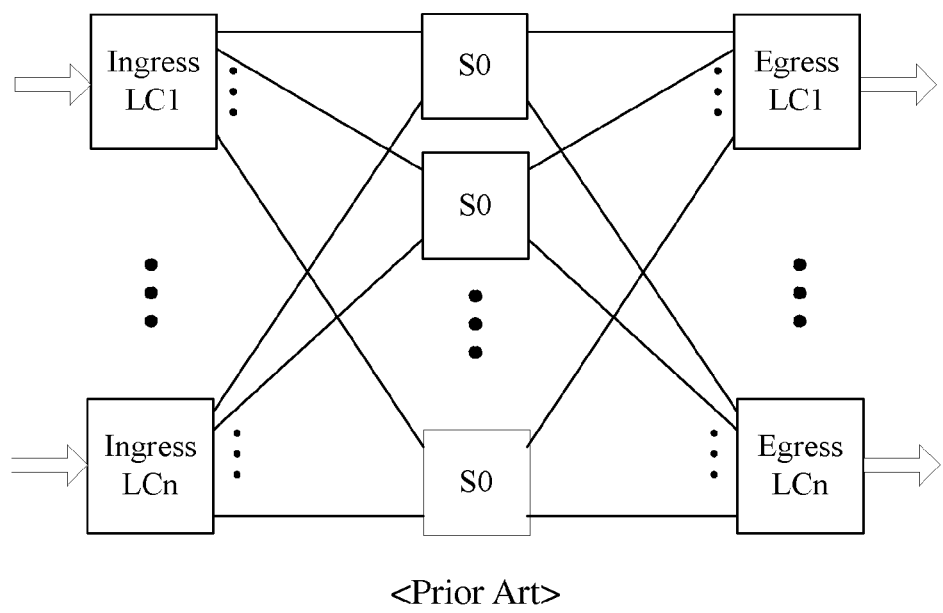
FIG. 1 shows a structure of an SF in the prior art.
Figure 2:
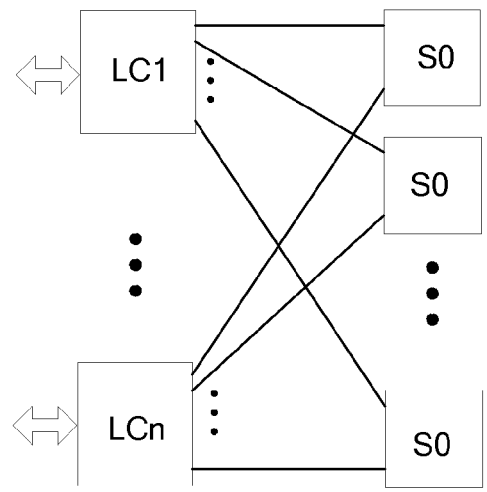
FIG. 2 shows a structure of another SF in the prior art.
Figure 3:
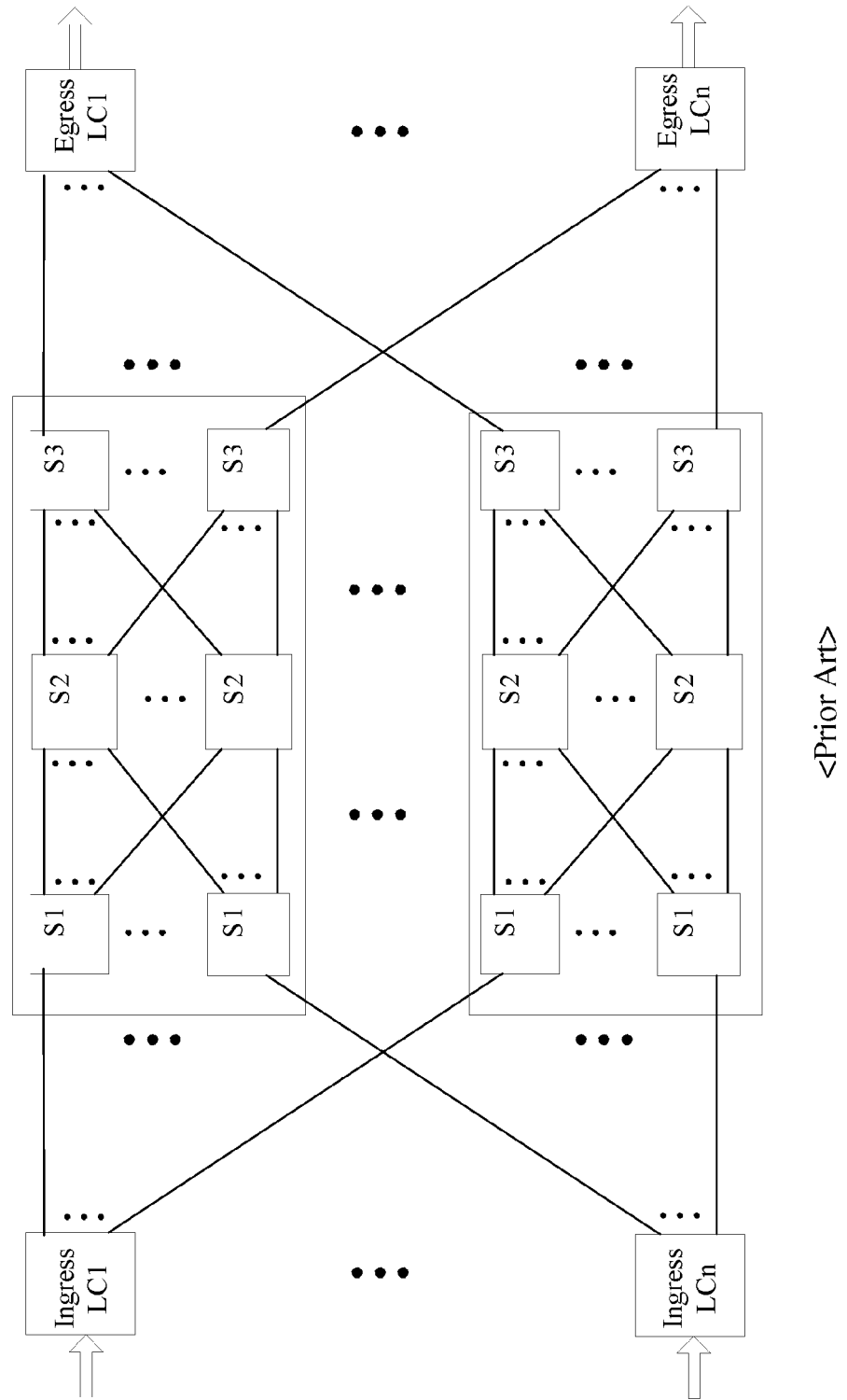
FIG. 3 shows a structure of another SF in the prior art.
Figure 4:
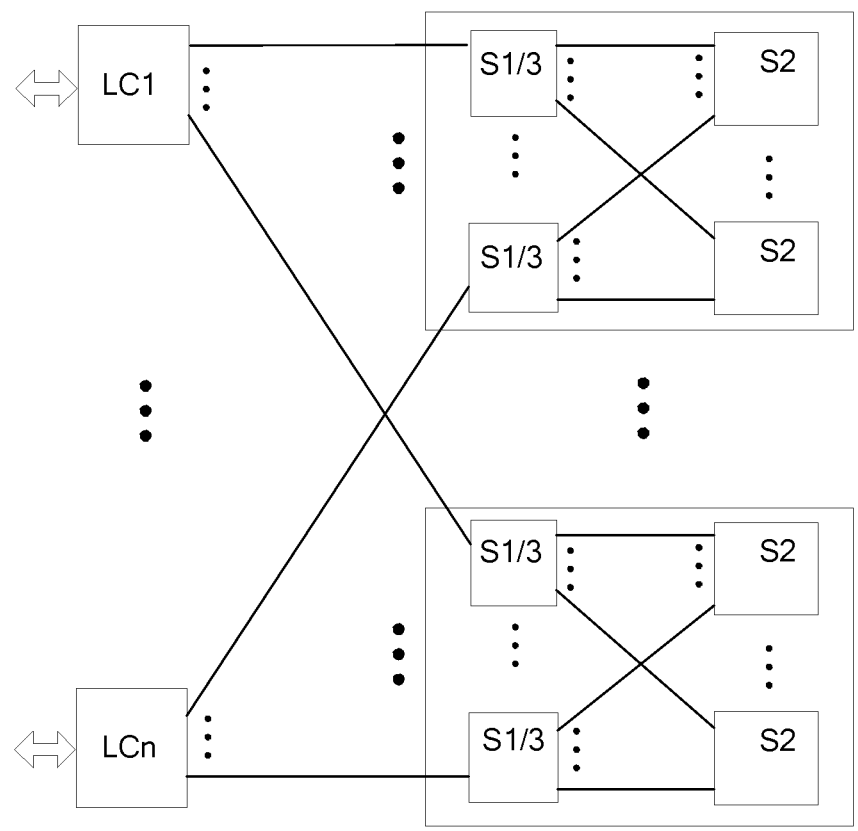
FIG. 4 shows a structure of another SF in the prior art.
Figure 5:
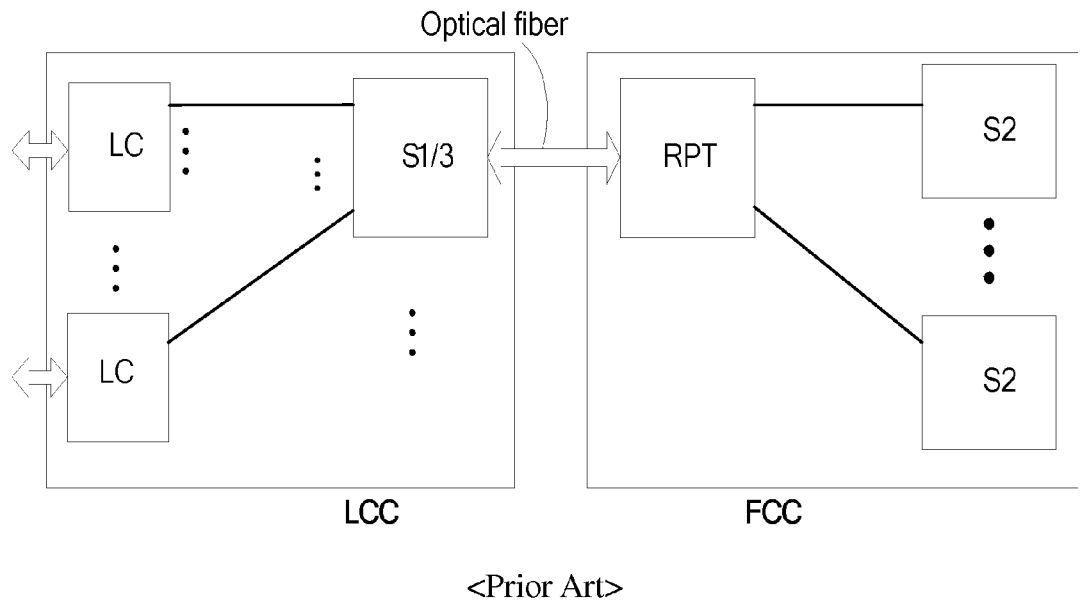
FIG. 5 shows a structure of a multi-stage switch system in the prior art.
Figure 6:
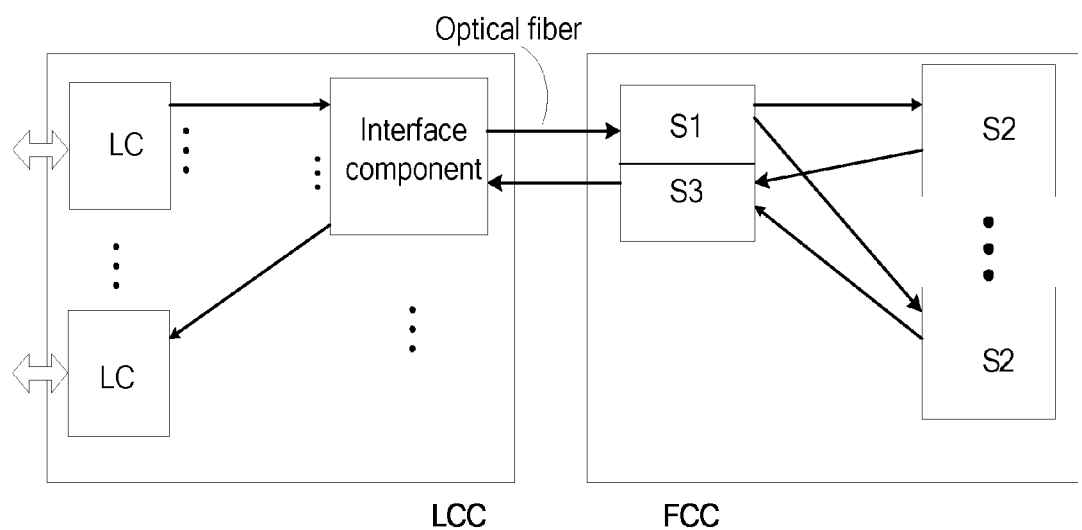
FIG. 6 shows a structure of a multi-stage switch system provided in Embodiment 1 of the present invention.

As shown in FIG. 6, a system is provided in Embodiment 1 of the present invention. The system includes at least one FCC, and one or more LCCs.

The FCC includes an S1, an S2, and an S3, where the S3 corresponds to the S1, and the S2 is connected to the S1 and S3 separately.

The LCC includes an interface component and an LC connected to the interface component, where the interface component is connected to the S1 and S3 in the FCC separately.

The interface component may be an S0 or an RPT. If the interface component is an S0, packets may be switched within the same LCC.

The FCC in the SF provided in Embodiment 1 includes: an S1, an S2, and an S3, where the S3 corresponds to the S1, and the S2 is connected to the S1 and S3 separately. The S1, S2, and S3 are located in the FCC. Therefore, when a switch element generates flow control information and requires another switch element or an LC to respond to the flow control information, a timely response can be received.

Embodiment 2

Figure 7:
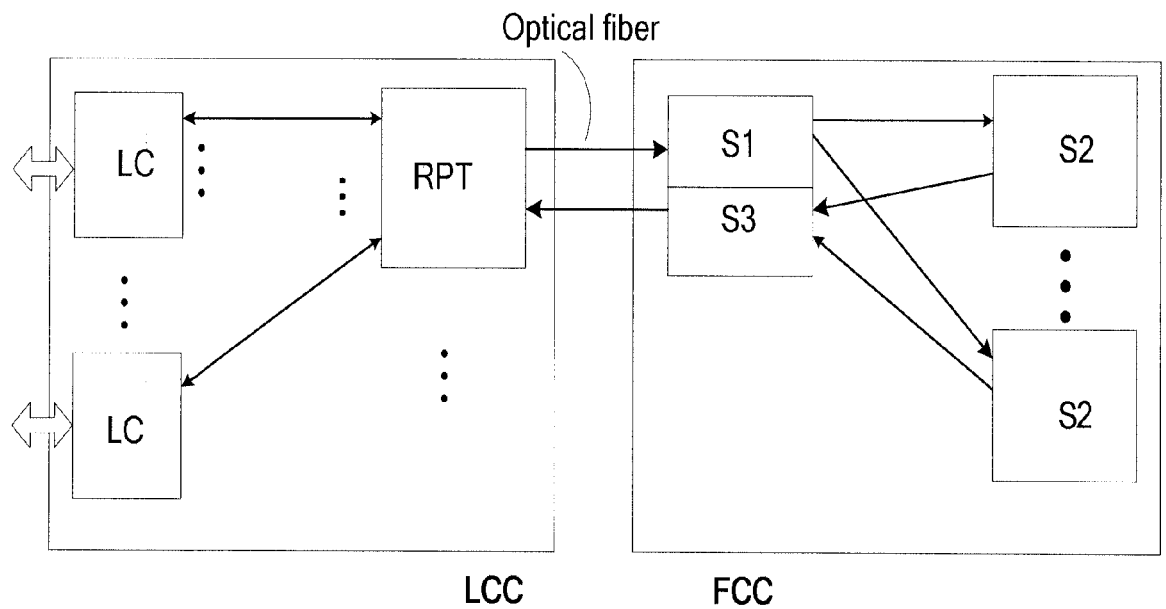
FIG. 7 shows a structure of a multi-stage switch system provided in Embodiment 2 of the present invention.

As shown in FIG. 7, a multi-stage switch system is provided in Embodiment 2 of the present invention. The multi-stage system includes at least one FCC, and one or more LCCs.

The LCC includes an LC and an RPT.

The FCC includes: an S1, an S2, and an S3, where the S3 corresponds to the S1, the S2 is connected to the S1 and S3 separately, and the S1 and S3 can be connected to the S2 through an electrical backplane or an optical fiber in the FCC.

Through this SF, the packets may be switched between different LCs. The packet format is shown in Table 1.

TABLE 1

| Destination LCC ID | Destination LC ID | Fragment# | Payload |
| --- | --- | --- | --- |

Fragment# indicates that the packet is a fragment of a large packet.

Specifically, the process of packet switching between different LCs includes: The RPT receives a packet sent by the source LC, and sends the packet to the S1 in the FCC through an optical fiber; according to a certain algorithm such as a load balancing algorithm, the S1 selects an S2, and sends the packet to the S2; according to the destination LCC ID, the S2 selects the S3 connected to the destination LCC, and sends the packet to the S3; according to the destination LC ID in the packet, the S3 sends the packet through an optical fiber to the RPT in the LCC, and the RPT forwards the packet to the destination LC. It should be noted that the RPT in this embodiment is only a transmission component, and does not perform operations such as packet switching. Therefore, similar to the LCC in Embodiment 4, the LCC in this embodiment may have no RPT.

Through this SF, the flow control information generated by the S3 may be quickly transmitted to the component required to respond to the flow control information. The component that responds to the flow control information may be the S2, S1, or LC. The following description assumes that the S2 is the component that responds to the flow control information: When congestion occurs at the S3, and the S3 wants to ask the S2 to suspend the sending of packets, the S3 generates flow control information that includes an ID of the S2 required by the S3 to respond to the flow control information (the ID may be an ID of one or more S2s); the S3 sends the flow control information to the S1 corresponding to the S3. It should be noted that the S3 and the corresponding S1 may be located in the same physical component or different physical components, and may be connected through a dedicated interface. According to the S2 ID carried in the flow control information, the S1 sends the flow control information to the S2. After receiving the flow control information, the S2 knows that congestion occurs at the S3 and suspends sending of packets to the S3. The flow control information needs to be transmitted only in this FCC, and does not need to be transmitted to the LCC through optical fibers as in the prior art. Therefore, the flow control information generated by the S3 can be transmitted to the S2 in time, and the S2 can respond to the flow control information in time.

In the following description, the LC is a component that responds to the flow control information sent by the S3: When congestion occurs at the S3, and the S3 wants to ask the LC to suspend the sending of packets, the S3 generates flow control information. The flow control information includes: an ID of the component required by the S3 to respond to the flow control information (namely, the ID of the LC) and the ID of the LCC where the LC is located; the S3 sends the flow control information to the S1 corresponding to the S3; according to an algorithm such as a load balancing algorithm, the S1 selects one or more S2s, and sends the flow control information to the S2; according to the ID of the LCC, the S2 determines the S3 connected to the LCC, and sends the flow control information to the S3; according to the ID of the LC, the S3 sends the flow control information to the LC through the RPT. In the transmission process of the flow control information, the flow control information passes through the optical fibers between the LCC and the FCC only once. By contrast, in the prior art, the flow control information passes through the optical fibers between the LCC and the FCC twice. Therefore, in the solution disclosed herein, the flow control information generated by the S3 can be transmitted to the LC in time.

The flow control information generated by the S2 can be quickly transmitted to the component that responds to the flow control information, for example, transmitted to the S1 or the LC. The following description assumes that the component that responds to the flow control information is the S1: When congestion occurs at the S2, and the S2 wants to ask the S1 to suspend the sending of packets, the S2 generates flow control information, where the flow control information includes an ID of the component required to respond to the flow control information (namely, the ID of the S1); the S2 sends the flow control information to the S3 corresponding to the S1; the S3 sends the flow control information to the S1 according to the ID of the S1 in the flow control information; after receiving the flow control information, the S1 knows the congestion at the S2, and suspends sending of packets to the S2. The flow control information needs to be transmitted only in this FCC, and does not need to be transmitted to the LCC through optical fibers as in the prior art. Therefore, the flow control information generated by the S2 can be transmitted to the S1 in time, and the S1 can respond to the flow control information in time.

It should be noted that the mapping relationships between components that generate and respond to the flow control information are not limited to the correspondence shown in the three scenarios above. Other modes of generating and responding to the flow control information are also applicable to the technical solution provided herein.

In the SF provided in Embodiment 2, the S1, S2, and S3 are all located in the FCC. The RPT in the LCC serves the purpose of only transmitting data or information, and therefore, the flow control information generated by the S3 can be transmitted to the S2 in time, the flow control information generated by the S2 can be transmitted to the S1 in time, and the flow control information can be responded to in time.

Embodiment 3

Figure 8:
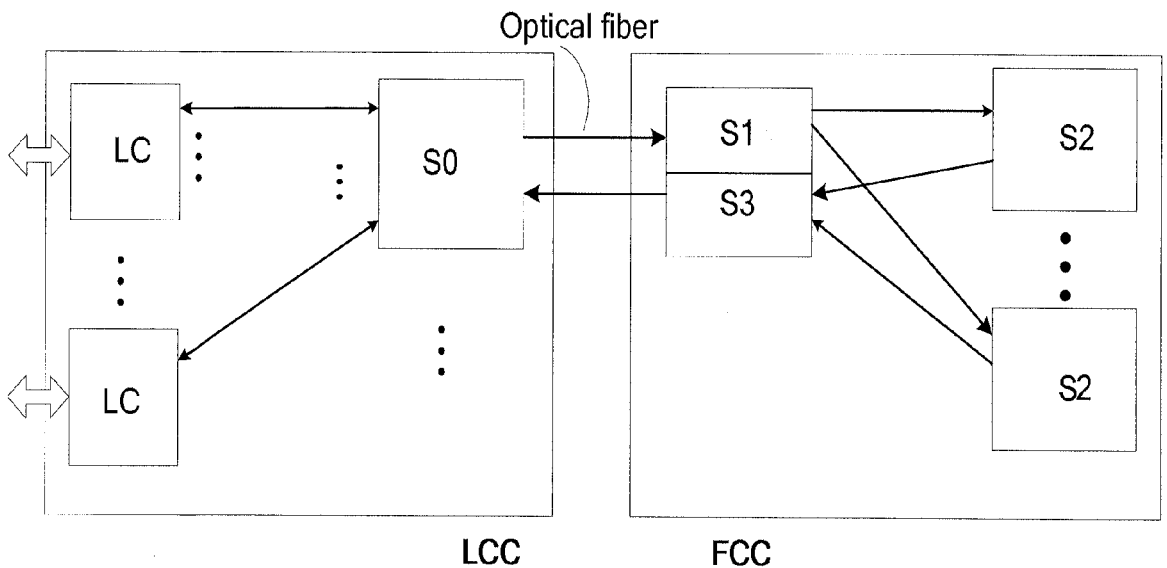
FIG. 8 shows a structure of a multi-stage SF provided in Embodiment 3 of the present invention.

As shown in FIG. 8, a multi-stage switch system is provided in Embodiment 3 of the present invention. The multi-stage switch system includes at least one FCC, and one or more LCCs.

The LCC includes an LC and an S0. The FCC includes: an S1, an S2, and an S3, where the S3 corresponds to the S1, the S2 is connected to the S1 and S3 separately, and the S1 and S3 can be connected to the S2 through an electrical backplane or an optical fiber in the FCC. FIG. 8 shows a one-to-one mapping relationship between the S0 and the S1/3 ("S1/3" indicates that the S1 corresponds to the S3). In fact, a many-to-many mapping relationship exists between the S0 and the S1/3. In the following description, the mapping relationship is a one-to-one relationship.

To make the embodiments of the present invention clearer, the following describes a single-stage SF briefly. In a single-stage SF, the LC and S0 are located in an LCC, and can be interconnected through an electrical backplane or an optical fiber in the LCC. The S0 is adapted to forward packets from one LC to another in the LCC. The LCC in an SF provided in this embodiment may be an LCC in a single-stage SF. The switch elements can keep its original configuration as the S0s. It is not required to change the S0 to the S1/3 during system expansion in which the LCC is connected to the FCC. Therefore, the traffic in the existing LCC can be kept uninterrupted by directly connecting the existing LCC to the FCC without changing the configuration of the LCC in operation (or changing the switch elements).

Through this SF, the packets may be switched between different LCCs and within the same LCC. The packet format is shown in Table 1.

Specifically, the packet switching process includes: The S0 receives a packet sent by the source LC, and determines whether the packet is directed to this chassis or any other chassis according to the destination LCC ID carried in the packet. If the packet is directed to this chassis, the S0 sends the packet to the destination LC according to the destination LC ID. If the packet is directed to another chassis, the S0 selects an S1 according a specific algorithm such as a load balancing algorithm, and sends the packet to the S1 in the FCC. According to the load balancing algorithm, the S1 selects an S2, and sends the packet to the S2. According to the destination LCC ID, the S2 selects the S3 connected to the destination LCC, and sends the packet to the S3. If the S3 is connected to more than one S0, the S3 may select an S0 according to a specific algorithm such as a load balancing algorithm, and send the packet to the foregoing S0 in the LCC. According to the ID of the destination LC, the S0 sends the packet to the destination LC.

Figure 9:
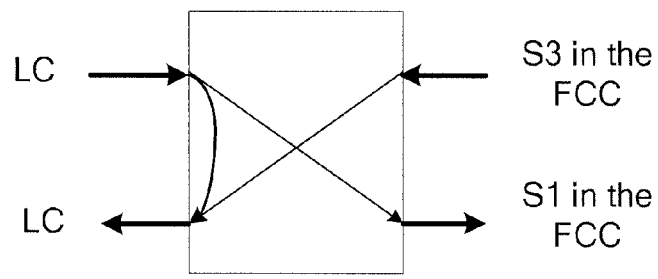
FIG. 9 shows a structure of an S0 provided in Embodiment 3 of the present invention.

FIG. 9 shows a structure of an S0 in FIG. 8. No matter whether the S0 is applied to a single chassis or multiple interconnected chassis, local packet switching can be performed between the LCs in this chassis. As shown in FIG. 9, when multiple chassis are interconnected, the S0 may send the packet in this chassis to the S1 in the FCC, and forward the packet from the S3 in the FCC to the LC in this chassis, and switch the packet between different LCs in this chassis.

Through this SF, the flow control information generated by the S3 may be quickly transmitted to the component required to respond to the flow control information. The component that responds to the flow control information may be the S2, S1, or LC. The following description assumes that the S2 is the component that responds to the flow control information: When congestion occurs at the S3, and the S3 wants to ask the S2 to suspend the sending of packets, the S3 generates flow control information that includes an ID of the component required by the S3 to respond to the flow control information (namely, the ID of the S2), where the component that responds to the flow control information may be one or more S2s; the S3 sends the flow control information to the S1 corresponding to the S3. It should be noted that the S3 and the corresponding S1 may be located on the same physical component or different physical components, and may be connected through a dedicated interface. According to the S2 ID carried in the flow control information, the S1 sends the flow control information to the S2. After receiving the flow control information, the S2 knows that congestion occurs at the S3 and suspends the sending of packets to the S3. The flow control information needs to be transmitted only in this FCC, and does not need to be transmitted to the LCC through optical fibers as in the prior art. Therefore, the flow control information generated by the S3 can be transmitted to the S2 in time, and the S2 can respond to the flow control information in time.

In the following description, the LC is a component that responds to the flow control information sent by the S3: When congestion occurs at the S3, and the S3 wants to ask the LC to suspend the sending of packets, the S3 generates flow control information. The flow control information includes: an ID of the component required by the S3 to respond to the flow control information (namely, the ID of the LC) and the ID of the LCC that includes the LC; the S3 sends the flow control information to the S1 corresponding to the S3; according to an algorithm such as a load balancing algorithm, the S1 selects one or more S2s, and sends the flow control information to the S2; the S2 determines the S3 connected to the LCC according to the ID of the LCC, and sends the flow control information to the S3; the S3 sends the flow control information to the S0 connected to the S3, and the S0 sends the flow control information to the LC according to the ID of the LC. The S3 can also determine the LC that responds to the flow control information according to the ID of the LC, and ask the S0 to send the flow control information to the LC. In this case, as an RPT, the S0 serves the purpose of only forwarding the flow control information. In the transmission process of the flow control information, the flow control information passes through the optical fibers only once. By contrast, in the prior art, the flow control information passes through the optical fibers twice. Therefore, in the solution disclosed herein, the flow control information generated by the S3 can be transmitted to the LC in time.

The flow control information generated by the S2 can be quickly transmitted to the component that responds to the flow control information, for example, transmitted to the S1 or the LC. The following description assumes that the component that responds to the flow control information is the S1: When congestion occurs at the S2, and the S2 wants to ask the S1 to suspend the sending of packets, the S2 generates flow control information, and the flow control information includes an ID of the S1 required by the S2 to respond to the flow control information; the S2 sends the flow control information to the S3 corresponding to the S1; the S3 sends the flow control information to the S1 according to the ID of the S1 in the flow control information; after receiving the flow control information, the S1 knows the congestion at the S2, and suspends sending of packets to the S2. The flow control information needs to be transmitted only in this FCC, and does not need to be transmitted to the LCC through optical fibers as in the prior art. Therefore, the flow control information generated by the S2 can be transmitted to the S1 in time, and the S1 can respond to the flow control information in time.

It should be noted that the mapping relationships between components that generate and respond to the flow control information are not limited to the correspondence shown in the three scenarios above. Other modes of generating and responding to the flow control information are also applicable to the technical solution provided herein.

In the SF provided in Embodiment 3, the S1, S2, and S3 are all located in the FCC. Therefore, the flow control information generated by the S3 can be transmitted to the S2 in time, the flow control information generated by the S2 can be transmitted to the S1 in time, and the flow control information can be responded to in time. Further, because the S0 exists in the FCC, packets can be switched between LCs in the chassis. Moreover, because the packets are switched in the LCC, the packet switching delay in the LCC is reduced, the traffic sent to the FCC is reduced, and the probability of FCC congestion is reduced. In addition, fewer optical fibers are used for connection between the S0 and the S1/S3, fewer optical fibers are required for interconnection between the LCC and the FCC, and the costs are reduced; further, in the case of interconnection between the LCC and the FCC, the configuration of the switch elements in the LCC is still the configuration of the S0, without the need of changing the S0 to the S1/S3. Therefore, the system can be upgraded by connecting the existing LCC to the FCC directly, without changing the existing LCC.

Embodiment 4

Figure 10:
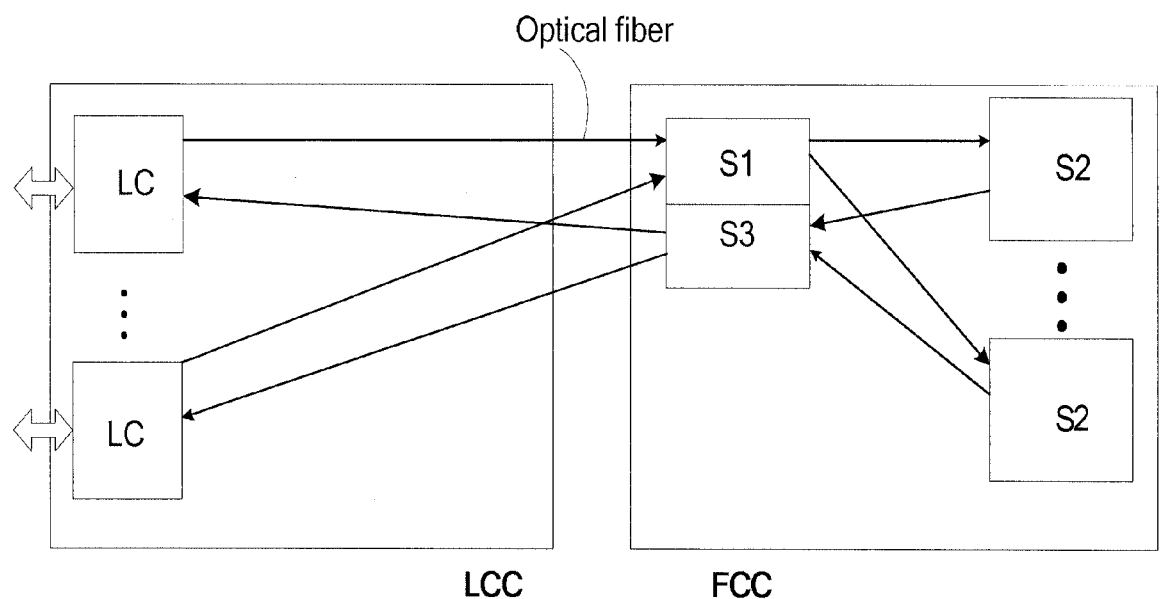
FIG. 10 shows a structure of a multi-stage switch system provided in Embodiment 4 of the present invention.

As shown in FIG. 10, a multi-stage switch system is provided in Embodiment 4 of the present invention. The multi-stage switch system includes at least one FCC, and one or more LCCs.

The FCC includes an S1, an S2, and an S3, where the S3 corresponds to the S1, and the S2 is connected to the S1 and S3 separately.

The LCC includes an LC connected to the S1 and S3 in the FCC separately. More specifically, the LC is connected to the S1 and S3 in the FCC separately through signal cables.

The process of switching a packet between different LCs includes: The packet sent by the source LC is transmitted to the S1 in the FCC through an optical fiber; according to a certain algorithm such as a load balancing algorithm, the S1 selects an S2, and sends the packet to the S2; according to the destination LCC ID, the S2 selects the S3 connected to the destination LCC, and sends the packet to the S3; according to the destination LC ID in the packet, the S3 sends the packet through an optical fiber to the destination LC in the LCC.

The process of generating and transmitting the flow control information is similar to that in Embodiment 2, and is not described further.

In the SF provided in Embodiment 4, the S1, S2, and S3 are all located in the FCC. Therefore, the flow control information generated by the S3 can be transmitted to the S2 in time, the flow control information generated by the S2 can be transmitted to the S1 in time, and the flow control information can be responded to in time.

Embodiment 5

Figure 11:
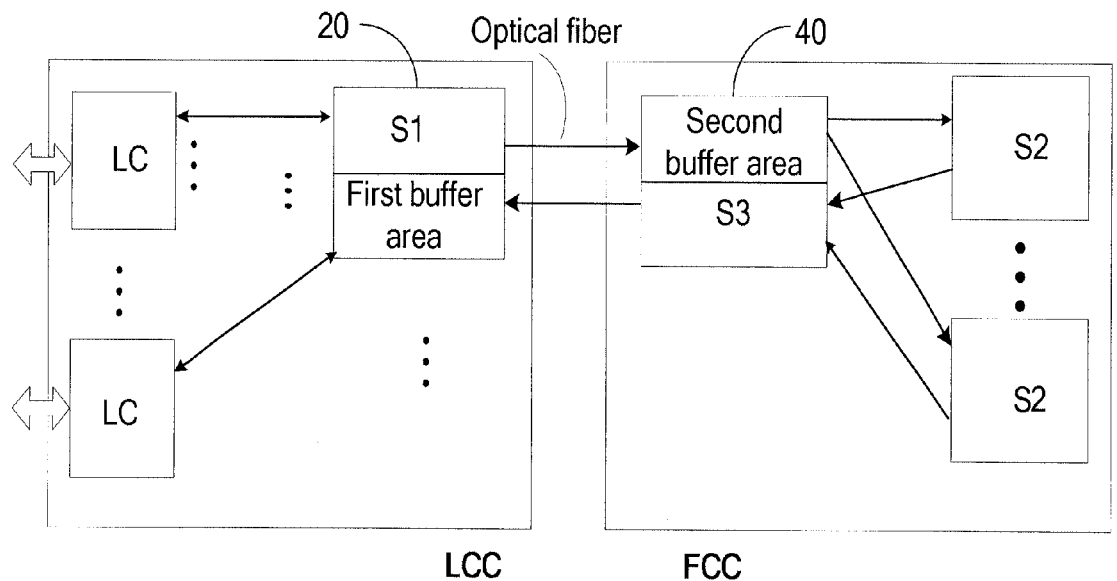
FIG. 11 shows a structure of a multi-stage switch system provided in Embodiment 5 of the present invention.

As shown in FIG. 11, a multi-stage switch system is provided in Embodiment 5 of the present invention. The multi-stage switch system is configured with at least one FCC, and one or more LCCs, where the FCC is connected to the one or more LCCs through optical fibers.

An LCC is configured with a first switch combination 20 and multiple LCs, where the first switch combination 20 includes an S1 and a first buffer area. The S1 and the first buffer area of the first switch combination 20 are connected to the multiple LCs.

An FCC is configured with a second switch combination 40 and multiple S2s, where the second switch combination 40 includes an S3 and a second buffer area. The S1 corresponds to the S3 (namely, the S1 is logically connected to the S3), but the S1 is located in the LCC and the S3 is located in the FCC. The S3 and the second buffer area of the second switch combination 40 are connected to the multiple S2s.

Through the switch system provided in the embodiment of the present invention, the packets may be switched between different LCs. The packet format is shown in Table 1.

The packet switching process includes: The S1 receives a packet sent by a source LC; according to an algorithm such as a load balancing algorithm, the S1 selects an S2, and sends the packet to the second buffer area corresponding to the S2, and the second buffer area sends the packet to the corresponding S2; according to the destination LCC ID, the S2 determines the S3 connected to the destination LCC, and sends the packet to the S3; through an optical fiber, the S3 sends the packet to the first buffer area corresponding to the destination LC; and the first buffer area sends the packet to the destination LC according to the destination LC ID.

Through the multi-stage switch system provided in the embodiment of the present invention, the flow control information sent by the S2 to the S1 is responded to in time, the flow control information sent by the LC to the S3 is responded to in time, and the flow control information sent by the S3 to the S2 is responded to in time.

In the embodiment of the present invention, the LCC is configured with multiple first switch combinations 20. Each of the first switch combinations 20 includes an S1 and a first buffer area, which are bound to each other.

In the embodiment of the present invention, the FCC is configured with multiple second switch combinations 40. Each of the second switch combinations 40 includes an S3 and a second buffer area, which are bound to each other.

Specifically, the process of transmitting the flow control information generated by the S2 includes: When congestion occurs at the S2, and the S2 wants to ask the S1 to suspend the sending of data flows, the S2 generates flow control information that includes an ID of the component required by the S2 to respond to the flow control information (namely, the ID of the S1). The S2 transmits the flow control information to the S3 corresponding to the S1. According to the flow control information, the S3 knows that the S2 wants to ask the S1 to suspend the sending of packets, so that the S3 instructs the second buffer area bound to the S3 to buffer the packets from the S1, and sends the flow control information to the first buffer area bound to the S1. The first buffer area transmits the flow control information to the S1. After receiving the flow control information, the S1 learns that congestion occurs at the S2, and thus suspends sending of packets to the S2. After receiving the flow control information sent by the S2, the S3 asks the second buffer area bound to the S3 to buffer the data flows from the S1, and suspends sending of packets to the S2, thus relieving the congestion at the S2.

Specifically, the process of transmitting the flow control information generated by the LC includes: Congestion occurs at the LC, and the LC wants to ask the S3 to suspend the sending of packets. The LC generates flow control information that carries an ID of the component required by the LC to respond to the flow control information (namely, the ID of the S3). The flow control information generated by the LC is sent to the S1 corresponding to the S3 (the S3 that the LC wants to control). According to the flow control information, the S1 knows that the LC wants to instruct the S3 to suspend the sending of packets, so that the S1 asks the first buffer area bound to the S1 to buffer the packets from the S3, and sends the flow control information to the second buffer area bound to the S3. The second buffer area sends the flow control information to the S3. After receiving the flow control information, the S3 knows that congestion occurs at the LC, and thus suspends sending of packets to the LC. After receiving the flow control information, the S1 asks the first buffer area bound to the S1 to buffer the packets from the S3, and suspends sending of packets to the LC, thus relieving the congestion at the LC.

Specifically, the process of transmitting the flow control information generated by the S3 includes: The flow control information generated by the S3 is transmitted to the second buffer area bound to the S3, and the second buffer area sends the flow control information to the S2 according to the ID of the S2 required by the S3 to respond to the flow control information, where the ID is carried in the flow control information. After receiving the flow control information, the S2 knows that congestion occurs at the S3, and thus suspends sending of packets to the S3. The flow control information is transmitted only in the FCC so that it can be transmitted to the S2 quickly. In this way, the congestion at the S3 is solved in time.

It should be noted that the mapping relationships between components that generate and respond to the flow control information are not limited to the correspondence shown in the three scenarios above. Other modes of generating and responding to the flow control information are also applicable to the technical solution provided herein.

In the switch system provided in Embodiment 5, the S1 and the first buffer area bound to the S1 are located in the LCC, and the S3 and the second buffer area bound to the S3 are located in the FCC. Therefore, after receiving the flow control information sent by the S2, the S3 asks the second buffer area to buffer data flows from the S1, and suspends sending of data flows to the S2, which helps to relieve the congestion at the S2; after receiving the flow control information, the S1 asks the first buffer area to buffer packets from the S3, and suspends sending of packets to the LC, which helps to relieve the congestion at the LC. Further, this helps to reduce the quantity of optical fibers used for connecting the LCC to the FCC, thus reducing costs. In addition, the LCs in the same LCC may achieve local switching by using buffer areas directly, and therefore power consumption of the FCC is reduced.

Moreover, the first buffer area or the second buffer area may be replaced with the RPT or another processing logical unit as required. If it is replaced with the RPT, the process of transmitting the flow control information generated by the S3 is the same as the process of the second buffer area, and is not described further.

It is easily understandable that the first switch combination 20 also can include multiple S1s and multiple first buffer areas, and each S1 can be bound to multiple first buffer areas, or each first buffer area can be bound to multiple S1s, thus achieving flexible configuration. Additionally, the second switch combination 40 also can include multiple S3s and multiple second buffer areas, and each S3 can be bound to multiple second buffer areas, or each second buffer area can be bound to multiple S3s, thus achieving flexible configuration.

Embodiment 6

Figure 12:
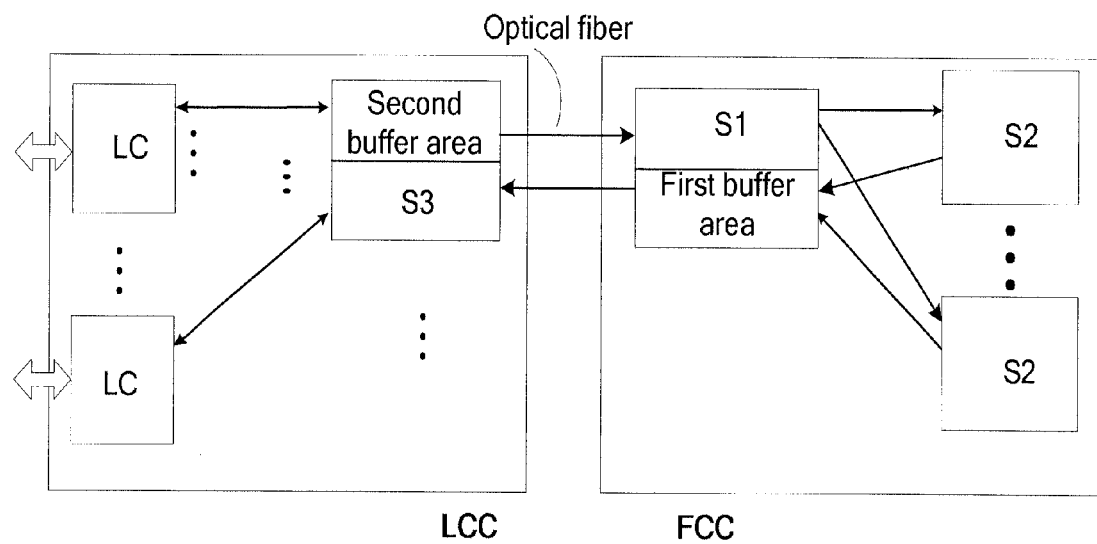
FIG. 12 shows a structure of a multi-stage switch system provided in Embodiment 6 of the present invention.

As shown in FIG. 12, a multi-stage switch system is provided in Embodiment 6. The multi-stage switch system is configured with at least one FCC, and one or more LCCs, The LCC includes: a second switch combination and LCs. The second switch combination is configured with an S3 and a second buffer area that is bound to the S3. The FCC includes a first switch combination and S2s. The first switch combination is configured with an S1 and a first buffer area that is bound to the S1. The S1 corresponds to the S3 (namely, the S1 is logically connected to the S3), but the S1 is located in the LCC and the S3 is located in the FCC.

Through the switch system provided in the embodiment of the present invention, packets can be switched between different LCs. The packet format is shown in Table 1.

Specifically, the packet switching process includes: The source LC sends a packet to the second buffer area; the second buffer area sends the packet to the S1 through an optical fiber; the S1 selects an S2 according to a load balancing algorithm, and sends the packet to the S2; according to the destination LCC ID, the S2 determines the S3 that receives the packet in the destination LCC; according to the mapping relationship between the S3 and the S1, the S2 sends the packet to the first buffer area bound to the S1 corresponding to the S3; the first buffer area sends the packet to the S3; and the S3 sends the packet to the destination LC according to the destination LC ID.

Through the switch system provided in the embodiment of the present invention, when the bandwidth of the optical fiber for connecting the LCC and the FCC converges, the buffer area can store packets temporarily. Specifically, because the bandwidth from the second buffer area to the S1 is less than the bandwidth from any LC in the LCC to the second buffer area, when the burst traffic of an LC in the LCC exceeds the bandwidth of the optical fibers used for interconnection, the second buffer area may buffer the received packet, and send flow control information to the LC in this chassis when necessary. Likewise, the first buffer area provides such functions as buffering packets, so that it may assist in forwarding packets within the chassis.

Detailed above is a multi-stage switch system provided in an embodiment of the present invention. Although the principle and embodiments of the invention have been set forth herein by way of specific examples, the descriptions are only for better understanding of the method in the embodiments of the invention and the essential idea thereof. Person having ordinary skill in the art can make variations and modifications to the present invention in terms of the specific implementations and application scopes according to the ideas of the present invention. Therefore, the specification shall not be construed as limitations to the present invention.

What is claimed is:

1. A multi-stage switch system, comprising a line card chassis (LCC) configured with multiple line cards (LCs), and a fabric card chassis (FCC) configured with a stage-2 switch element (S2), wherein the LCC communicates with the FCC, and the multi-stage switch system further comprising:
   a first switch combination and a second switch combination,
      wherein one of the first switch combination and the second switch combination is configured on the LCC, and the other one of the first switch combination and second switch combination is configured on the FCC,
      wherein multiple LCs establish cross communication through the first switch combination, the second switch combination and the S2,
   the first switch combination comprises a stage-1 switch element (S1) and a first buffer area, the second switch combination comprises a stage-3 switch element (S3)

and a second buffer area, the S1 is connected to the second buffer area, and the S3 is connected to the first buffer area, and wherein when congestion occurs at the S2, the S2 is configured to generate flow control information and transmit the flow control information to the second switch combination, and when the second switch combination receives the flow control information, the second switch combination is configured to instruct the second buffer to store packets transmitted to the S2, and transmit the flow control information to the first switch combination to suspend sending of packets to the S2.

2. The multi-stage switch system of claim 1, wherein the S1 is bound to the first buffer area.

3. The multi-stage switch system of claim 1, wherein the first switch combination comprises multiple first buffer areas and the S1 is bound to at least one first buffer area.

4. The multi-stage switch system of claim 1, wherein the S3 is bound to the second buffer area.

5. The multi-stage switch system of claim 1, wherein the second witch combination comprises multiple second buffer areas and the S3 is bound to at least one second buffer area.

6. The multi-stage switch system of claim 1, wherein the S1 is connected to the second buffer area through an optical fiber.

7. The multi-stage switch system of claim 1, wherein the S3 is connected to the first buffer area through an optical fiber.

8. The multi-stage switch system of claim 1, wherein the first buffer area is a buffer.

9. The multi-stage switch system of claim 1, wherein the second buffer area is a buffer.

10. A multi-stage switch system, comprising a line card chassis (LCC) configured with multiple line cards (LCs), and a fabric card chassis (FCC) configured with a stage-2 switch element (S2), wherein the LCC communicates with the FCC, and the multi-stage switch system further comprising:

a first switch combination and a second switch combination, wherein one of the first switch combination and the second switch combination is configured on the LCC, and the other one of the first switch combination and second switch combination is configured on the FCC, wherein multiple LCs establish cross communication through the first switch combination, the second switch combination and the S2, the first switch combination comprises a stage-1 switch element (S1) and a first buffer area, the second switch combination comprises a stage-3 switch element (S3) and a second buffer area, the S1 is connected to the second buffer area, and the S3 is connected to the first buffer area, and wherein when congestion occurs at one of the multiple LCs, the one of the LCs is configured to generate flow control information and transmit the flow control information to the first switch combination, and when the first switch combination receives the flow control information, the first switch combination is configured to instruct the first buffer to store packets transmitted to the one of the LCs, and transmit the flow control information to the second switch combination to suspend sending of packets to the one of the LCs.

* * * * *

UNITED STATES PATENT AND TRADEMARK OFFICE
CERTIFICATE OF CORRECTION

| | | |
|---|---|---|
| PATENT NO. | : 8,493,976 B2 | Page 1 of 1 |
| APPLICATION NO. | : 12/855160 | |
| DATED | : July 23, 2013 | |
| INVENTOR(S) | : Lin | |

It is certified that error appears in the above-identified patent and that said Letters Patent is hereby corrected as shown below:

In the Claims

Column 11, Line 21, in Claim 5, delete "witch" and insert -- switch --, therefor.

Signed and Sealed this
Twenty-second Day of July, 2014

Michelle K. Lee
*Deputy Director of the United States Patent and Trademark Office*